United States Patent Office.

GEORGE H. DONEY AND MOSES CLAY, OF LOCKPORT, ILLINOIS.

Letters Patent No. 62,828, dated March 12, 1867.

IMPROVEMENT IN MAKING SOAP.

*The Schedule referred to in these Letters Patent and making part of the same.*

Be it known that we, GEORGE H. DONEY and MOSES CLAY, of the town of Lockport, in Will county, and State of Illinois, have invented a new, useful, and improved Mode of Making Soap by the use of the ingredients and by the formula hereinafter described.

To enable others skilled in the art to make and use our invention, we will proceed to describe the manner in which we combine the several ingredients to make the same.

To make thirteen pounds of soap: First, we take two ounces or lime, dissolved in one pint of boiling rain water; after straining out the sediment, we add one ounce aqua ammonia, one ounce borax, and one-half pound sal soda, forming the first compound. Second, to one-half gallon of rain water we add one bar of common hard soap, one ounce saltpetre, one ounce borax, one-quarter pound resin, two ounces alum, one-quarter pound sal soda, two ounces common salt, and one ounce alcohol; after boiling this mixture ten minutes, we add one-half pint of the first mixture, which makes thirteen pounds of soap, or thereabouts.

Claim.

What we claim as new in our invention, and desire to secure by Letters Patent, is—

The use of the ingredients specified, in the particular proportions and manner set forth, to make soap.

GEORGE H. DONEY,
MOSES CLAY.

Witnesses:
   THOS. H. HUTCHINS,
   F. K. BAILEY.